(12) United States Patent
Nishikawa et al.

(10) Patent No.: US 10,917,487 B2
(45) Date of Patent: Feb. 9, 2021

(54) GENERATING NOTIFICATION DIGEST BASED ON USER PRESENCE

(71) Applicant: INTERNATIONAL BUSINESS MACHINES CORPORATION, Armonk, NY (US)

(72) Inventors: Yuriko Nishikawa, Koto-ku (JP); Yoshio Horiuchi, Hiratsuka (JP); Kazuto Yamafuji, Ichigao-cho Aoba-ku (JP); Masahiro Okawa, Kashiwa (JP); Takashi Takahashi, Shinjyuku-ku (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 33 days.

(21) Appl. No.: 16/246,875

(22) Filed: Jan. 14, 2019

(65) Prior Publication Data
US 2020/0228616 A1 Jul. 16, 2020

(51) Int. Cl.
*H04L 29/08* (2006.01)
*H04L 12/58* (2006.01)
(Continued)

(52) U.S. Cl.
CPC ............. *H04L 67/24* (2013.01); *G06K 9/325* (2013.01); *H04L 41/06* (2013.01); *H04L 51/24* (2013.01);
(Continued)

(58) Field of Classification Search
None
See application file for complete search history.

(56) References Cited

U.S. PATENT DOCUMENTS 9,979,688 B2 5/2018 Ohno
10,321,195 B1 * 6/2019 Nasir ................. H04N 21/4668
(Continued)

FOREIGN PATENT DOCUMENTS

| CN | 105116992 | * | 9/2015 |
| CN | 105116992 A | * | 12/2015 |
| JP | 2018013879 A | | 1/2018 |

OTHER PUBLICATIONS

"Telework Supporter"; https://www.canon-its.co.jp/products/telework/; Retrieved: Jul. 24, 2018; 15 pages.

*Primary Examiner* — Younes Naji
(74) *Attorney, Agent, or Firm* — Cantor Colburn LLP; Richard Wilhelm

(57) ABSTRACT

According to one or more embodiments of the present invention, an example method includes, based on a determination that a user is not present at a computing device, capturing a plurality of screen images from the computing device. The method further includes detecting one or more notifications being received based on a difference in a pair of consecutively captured screen images comprising a first screen image and a second screen image. The method further includes extracting a notification information for each notification by extracting a portion of the captured screen images corresponding to the one or more notifications respectively. The method further includes based on a determination that the user has returned at the computing device, generating and displaying a digest notification that comprises the extracted notification information for each of the one or more notifications that were received when the user was not present.

18 Claims, 7 Drawing Sheets

When no notification is present

When notification(s) are present

(51) Int. Cl.
*G06K 9/32* (2006.01)
*H04L 12/24* (2006.01)

(52) U.S. Cl.
CPC ........ *G06K 2209/01* (2013.01); *H04L 67/306* (2013.01)

(56) References Cited

U.S. PATENT DOCUMENTS

| | | |
|---|---|---|
| 2009/0054039 A1 | 2/2009 | Van Wijk et al. |
| 2013/0078958 A1 | 3/2013 | Kyprianou |
| 2014/0201678 A1 | 7/2014 | Shen |
| 2017/0132019 A1* | 5/2017 | Karashchuk .......... G06F 40/166 |
| 2019/0334849 A1* | 10/2019 | Bostick .................. H04L 51/32 |
| 2020/0076939 A1* | 3/2020 | Lambourne ....... H04M 1/72533 |

* cited by examiner

GENERATING NOTIFICATION DIGEST BASED ON USER PRESENCE

BACKGROUND

The present invention relates to computing technology, and particularly to a user interface for generating and providing a digest of notifications received in a duration when a user is not present.

Users of computing devices receive a variety of electronic notifications from one or more computer programs executing on the computing devices. For example, electronic notifications can be from computer programs such as communication service programs, operating system, antivirus, malware, timers, and the like.

SUMMARY

According to one or more embodiments of the present invention, an example method includes, based on a determination that a user is not present at a computing device, capturing a plurality of screen images from the computing device. The method further includes detecting one or more notifications being received based on a difference in a pair of consecutively captured screen images comprising a first screen image and a second screen image. The method further includes extracting a notification information for each notification by extracting a portion of the captured screen images corresponding to the one or more notifications respectively. The method further includes based on a determination that the user has returned at the computing device, generating and displaying a digest notification that comprises the extracted notification information for each of the one or more notifications that were received when the user was not present.

According to one or more embodiments of the present invention, a system includes a memory and a processor coupled with the memory. The processor generates a digest notification for one or more notifications received when a user is not present. Generating the digest notification is performed by executing a method that includes, based on a determination that a user is not present at a computing device, capturing a plurality of screen images from the computing device. The method further includes detecting one or more notifications being received based on a difference in a pair of consecutively captured screen images comprising a first screen image and a second screen image. The method further includes extracting a notification information for each notification by extracting a portion of the captured screen images corresponding to the one or more notifications respectively. The method further includes based on a determination that the user has returned at the computing device, generating and displaying a digest notification that comprises the extracted notification information for each of the one or more notifications that were received when the user was not present.

According to one or more embodiments of the present invention, a computer program product includes a computer readable storage medium having stored thereon program instructions executable by one or more processing devices to perform a method that includes, based on a determination that a user is not present at a computing device, capturing a plurality of screen images from the computing device. The method further includes detecting one or more notifications being received based on a difference in a pair of consecutively captured screen images comprising a first screen image and a second screen image. The method further includes extracting a notification information for each notification by extracting a portion of the captured screen images corresponding to the one or more notifications respectively. The method further includes based on a determination that the user has returned at the computing device, generating and displaying a digest notification that comprises the extracted notification information for each of the one or more notifications that were received when the user was not present.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

As used herein, a "notification" is an electronic notification, unless noted otherwise.

In one or more examples, the notification can be generated by a communication program. A user can use a variety of messaging services to communicate electronically. For example, the user can receive (and send) messages via multiple electronic messaging services such as email, instant message, chat, short message service, voice message, social media message, and the like. Moreover, the user may subscribe to multiple electronic messaging services of each type, for example, multiple email service, multiple chat services, and the like. The user receives a notification corresponding to receipt of a message from such electronic communications.

In addition, the user may receive notifications from one or more computer programs that are executing on the computing device, such as a timer, an antivirus, an operating system update, or other such computer programs.

Accordingly, the user of a computing device receives a variety of notifications. The notifications include visual notifications using user interface elements such as popups, message balloons, or other such user interface elements. The visual notification can be provided in different portions of a display of the computing device depending on which computer program generates the notification. The portion may also depend on other factors, such as a cause of the notification, a priority of the notification, and the like.

Figure 1:
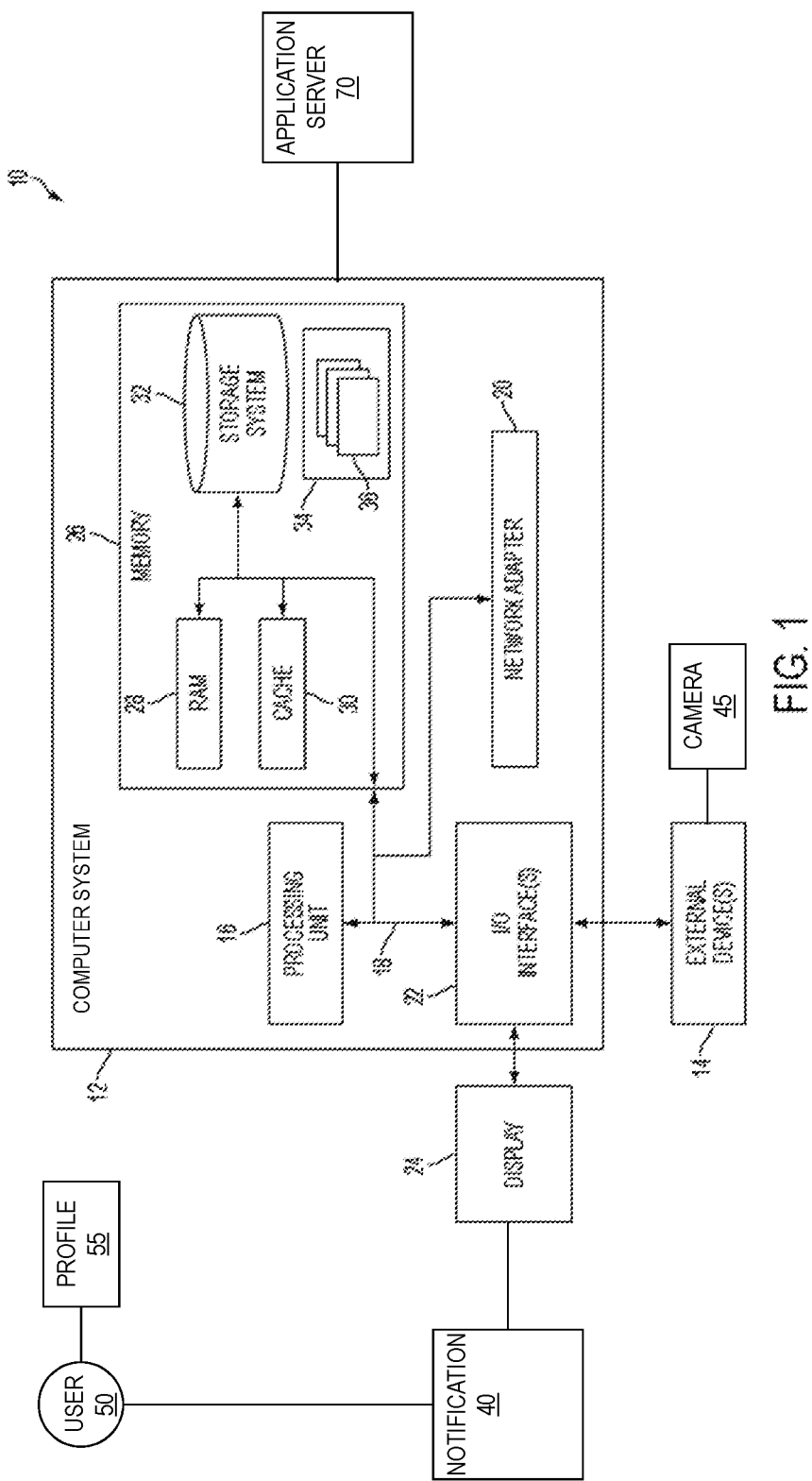
FIG. 1 depicts a schematic of an example of a system according to one or more embodiments of the present invention.

FIG. 1 depicts a schematic of an example of a system 10 according to one or more embodiments of the present invention. The system 10 is a computing system that facilitates executing one or more computer program applications and providing corresponding notifications to a user 50. The depicted system 10 is only one example of a suitable computing system and is not intended to suggest any limitation as to the scope of use or functionality of embodiments of the invention described herein. In one or more examples, the user 50 has a user profile 55.

In system 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in system 10 is shown in the form of a general-purpose computing device. The components of computer system 12 may include, but are not limited to, one or more processors or processing units 16, a system memory 26, and a bus 18 that couples various system components including system memory 26 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 12 typically includes a variety of computer system readable media. Such media may be any available media that is accessible by computer system 12, and it includes both volatile and non-volatile media, removable and non-removable media.

System memory 26 can include computer system readable media in the form of volatile memory, such as random access memory (RAM) 28 and/or cache memory 30. Computer system 12 may further include other removable/non-removable, volatile/non-volatile computer system storage media. By way of example only, storage system 32 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 26 may include at least one program product having a set (e.g., at least one) of program modules that are configured to carry out the functions of embodiments of the invention.

Program/utility 34, having a set (at least one) of program modules 36, may be stored in memory 26 by way of example, and not limitation, as well as an operating system, one or more application programs, web browser, other program modules, and program data. Each of the operating system, one or more application programs, other program modules, and program data or some combination thereof may include an implementation of a networking environment. Program modules 36 generally carry out the functions and/or methodologies of embodiments of the invention as described herein.

Computer system 12 may also communicate with one or more external devices 14 such as a keyboard, a pointing device, a camera 45, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include but are not limited to: microcode, device drivers, redundant processing units, external disk drive arrays, RAID systems, tape drives, and data archival storage systems, etc.

The computer system 12 can facilitate a user 50 to receive a notification 40 via the display 24.

Figure 2:
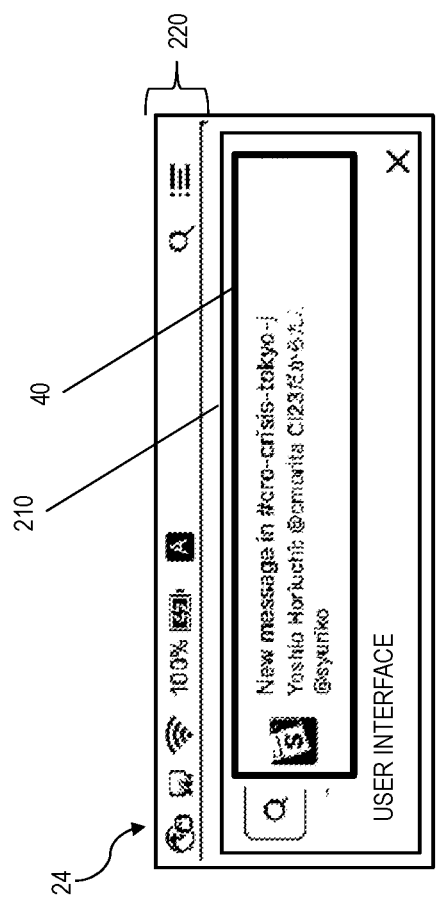
FIG. 2 depicts an example notification.

FIG. 2 depicts an example notification. In the figure, the notification 40 is depicted to be a message, however, it is understood that the notification can be of any other type. In one or more examples, the notification 40 may cover a user interface of a computer application 210 that is executing on the computer system 12, as depicted. FIG. 2 also depicts additional user interface elements 220 of the computer system 12, such as a battery charge, wireless network status, and the like. It is understood that in one or more examples, the additional user interface elements 220 can be different from those depicted herein. Further, the relative positioning of the notification 40 with respect to the additional user interface elements 220 is merely one possible example; in one or more examples, the positioning can be different.

In one or more examples, the notification 40 can be generated by a computer application that has a backend operation on an application server 70. The notification 40 has a layout that includes positions and sizes of one or more visual user interface elements, such as text, images, emoticons, buttons, links, and the like. The application server 70 can update the layout of the notification 40 periodically. In one or more examples, the notification 40 is generated by a computer application that is executed locally, on the computer system 12 itself. In one or more examples, the application can be a web browser, an instant messenger, a teleconferencing application, a game, an antivirus, an operating system, an alarm, a media streaming application, or any other such computer application.

A technical challenge with such notifications 40 is that while the user 50 is away from his/her desk, and not present to view the computing system 12, and if the notification 40 arrives during that duration, the user 50 is likely to overlook the notification 40 because the notification 40, typically, disappears after a predetermined time since being shown. The presence of the user 50 can be detected by the camera 45, in one or more examples. In one or more examples, the presence of the user 50 is detected using other techniques, such as one or more sensors (motion sensor, heat sensor etc.), input device detection, and the like.

One or more embodiments of the present invention address such technical challenges of the user interface of the computer system 12, where the user 50 misses such notifications 40. When it is detected that the user 50 is not actively using the computing system 12, a state of the display 24 is captured at a predetermined frequency. The notification 40 is automatically detected based on determining a difference between captured screens being more than a predetermined number of pixels. Here, capturing a screen refers to capturing an image of the contents of the display 24. In one or more examples, the capturing of the screen may be performed on a per window basis. The notification is accordingly identified based on the difference in the images of the contents of the display 24. Further, according to one or more embodiments of the present invention information of the notification 40 is extracted from the captured image (s) and an importance level is assigned to the notification 40 based on the extracted information. In one or more examples, such a process continues until the user 50 is not present at his/her desk to view the computer system 12.

When it is detected, for example, by the camera 45, that the user 50 has returned to the computer system 12, a playback is performed collectively to display only the recorded notifications. In this playback, screen portions having a difference from a preceding and/or succeeding screen images are highlighted. Notifications with importance level above a predetermined threshold are identified and highlighted in one or more examples. For example, when a digest is presented to the user 50, important notifications are displayed in a highlighted manner. Further, when no notification has arrived during the time period the user 50 has been away from his/her desk, a message is generated and displayed letting the user 50 know that no messages were received.

According to one or more embodiments of the present invention, the improvements to computer application user interfaces, such as those used for providing notifications are provided by one or more embodiments of the present invention. The improvements provided by one or more embodiments of the present invention are rooted in computing technology, particularly user interface for notifications received by a user via a computing device, particularly when the user is not viewing the computing device.

Figure 3:
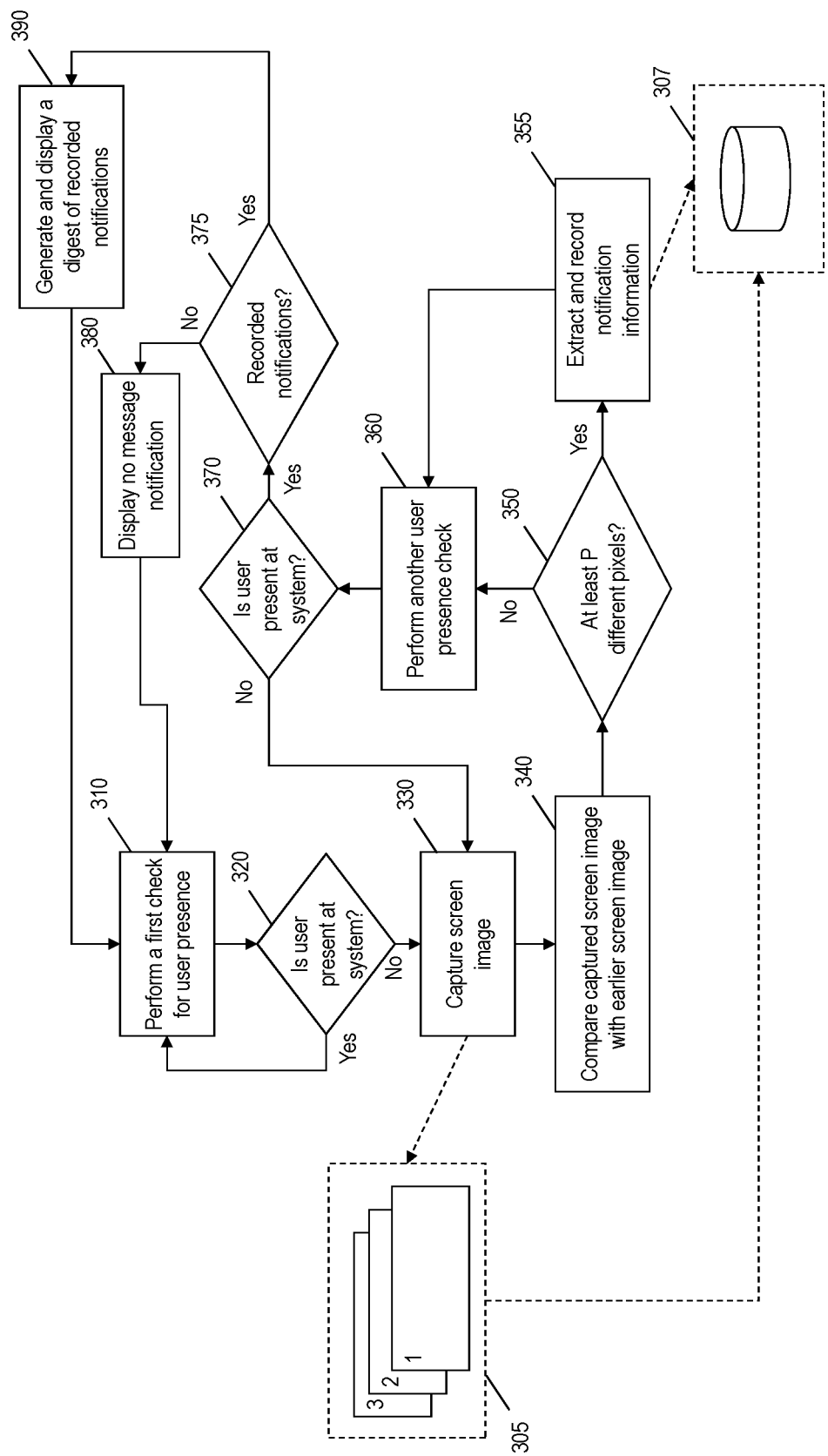
FIG. 3 depicts a flowchart of an example method for generating a digest for notifications received during user absence according to one or more embodiments of the present invention.

FIG. 3 depicts a flowchart of an example method for generating a digest for notifications received during user absence according to one or more embodiments of the present invention. The method includes performing a first check to determine user presence, at 310. The user presence includes the user 50 being present at his/her desk to use the computer system 12. Alternatively, or in addition, the user presence includes the user 50 looking at the computer system 12. In one or more examples, the user presence is detected using one or more sensors of the computer system 12, for example, the camera 45, the I/O devices, motion sensors, heat sensors, or any other such external devices 14.

If the user 50 is present, the method includes continuing to monitor the user presence, at 320. If the user 50 is not present, that is the user is absent, the method includes capturing a screen image, at 330. The captured screen image is stored in a screen capture repository 305. The captured screen image can be for the entire display 24. Alternatively, the captured screen image is for a specific portion of the display 24, such as a predetermined pixel that are represented by screen coordinates, for example. Alternatively, or in addition, the portion can be specified by a window associated with one or more particular computer applications for which the notifications 40 are to be monitored.

The captured screen image is compared with an earlier captured screen image, at 340. For example, a captured screen image at time T2 is compared with a captured screen image at time T1, T2>T1. In one or more examples, the captured screen images at T1 and T2 are consecutively captured screen images. If the two compared screen images differ by at least a threshold number of pixels, say P, it is deemed that a notification 40 was received, the difference in images representing the notification user interface that has been rendered on the display 24, at 350. The threshold number of pixels can be a predetermined number of pixels, for example 64, 256, and so on. In one or more examples, the pixels that differ are required to be in a particular portion of the screen, for example, bottom right corner, top of the screen, and the like. The portion of the screen image that is to be monitored can be selected by the user 50 in one or more examples, depending on the type of computer system 12.

If the two captured screen images differ by at least the threshold number of pixels, the notification 40 is extracted from the captured screen image, in this case at time T2, at 355. The notification 40 that is extracted automatically from the captured screen image(s) 305 is stored in a notification repository 307. It should be noted that although example methods for detecting the difference between images using pixels is described here, different techniques can be used in other embodiments. For example, "chunks" or predetermined sets of pixels can be used for detecting such differences. For example, only if at least a predetermined number of such chunks of pixels differ among two images, further analysis is performed.

Once the comparison of the captured screen images is completed, another user presence check is performed, at 360. If the user 50 is back and/or viewing the display 24, the method includes determining if any notification(s) 40 were recorded in the notification repository 307, at 370 and 375. If a notification 40 is not recorded, a computer system 12 generates a notification 40 that indicates to the user 50 that notifications were not received while s/he was not present, at 380.

Instead, if notification(s) 40 are recorded in the notification repository 307, the computer system 12 generates and displays a digest of the recorded notifications 40, at 390. The method is executed continuously in this manner, and loops back to monitoring user presence. In one or more examples, the captured screen capture repository 305 and the notification repository 307 are cleared after every iteration.

Figure 4:
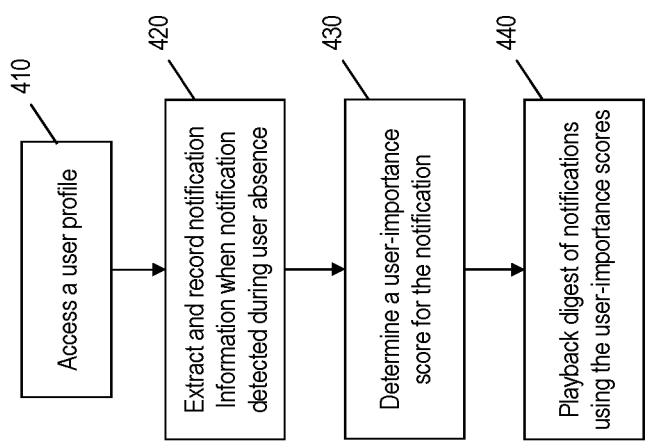
FIG. 4 depicts a flowchart of an example method for generating the notification digest according to one or more embodiments of the present invention.

FIG. 4 depicts a flowchart of an example method for generating the notification digest according to one or more embodiments of the present invention. The method includes accessing a user profile 55, at 410. Accessing the user profile 55, in one or more examples, includes generating the user profile 55 using past behavioral data of the user 50 monitored during the user's use of the computer system 12. Alternatively, or in addition, one or more parameters of the user profile 55 are provided by the user 50 directly.

Figure 5:
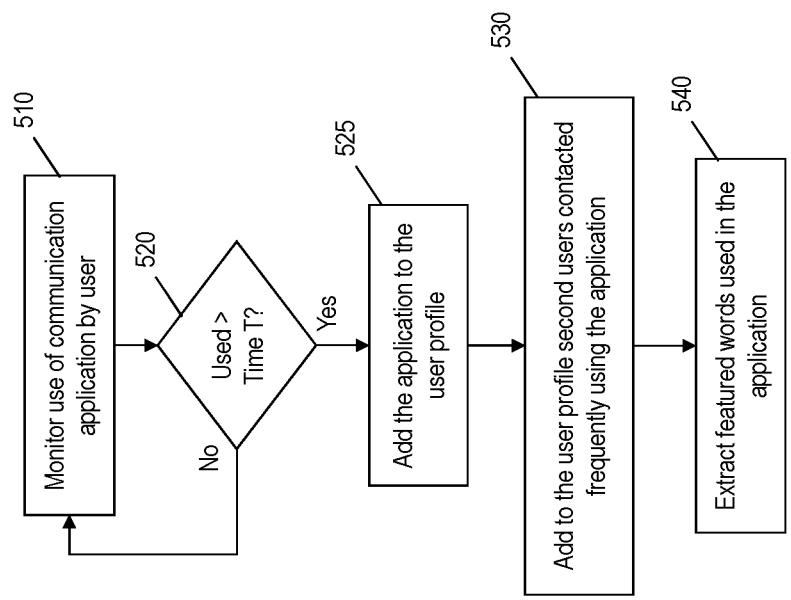
FIG. 5 depicts a flowchart for an example method for generating the user profile according to one or more embodiments of the present invention.

FIG. 5 depicts a flowchart for an example method for generating the user profile according to one or more embodiments of the present invention. The method includes monitoring the use by the user 50 of an application (computer program) for a communication service, at 510. For example, the camera 45 is used to determine whether the user 50 has been using the application for the communication service for at least a particular period of time, say T. Alternatively, or in addition, the operating system of the computer system 12 is queried to determine the period of time the application for the communication service is used. The user profile 55 can include a name of the communication service that the user has accessed with a frequency larger than the threshold T in a particular period of time in the past, at 520 and 525. For example, the user profile 55 can record that the user 50 used SKYPE™ to communicate more than at least 30 times in the past two days.

The user profile 55 can also store a name, or identity of a second user with whom the user 50 has communicated using the most frequent communication service or another communication service in the particular time period, at 530. For example, the user profile 55 can record that the user 50 communicated at least three times in the past two days.

Further, the user profile 55 can store featured words that are extracted from a text received or sent by the user 50 using the communication services, at 540. In one or more examples, the featured words are extracted from the text used in the past predetermined duration, such as twenty days or the like. The featured words from the text can be identified using techniques such as term frequency-inverse document frequency (TF-IDF), or any other such techniques.

In one or more examples, the above-described information can be explicitly added to the user profile 55 by the user 50. Alternatively, or in addition, the access frequency, or the number of accesses can be obtained automatically by the computer system based on the actions of the user 50 when using the computer system 12. For example, the access frequency and actions can be detected by the camera 45 and/or other sensors from the number of browsing operations performed on the communication service. An access time period can be obtained by eye gaze information that is obtained by the camera 45. Further, the most frequently communicated second user can be detected based on a number of mentions of a user-name or identity of the second user, for example, "@second-user".

Further, the method includes automatically obtaining the notification information when the notification 40 is detected during the user's 50 absence, at 420. The information is extracted automatically from the captured screen images and stored in the notification repository 307 (see 355). The information is extracted by obtaining text information from the captured screen image, and particularly the difference that is detected from the earlier screen image using optical character recognition (OCR). For example, an OCR service can be used via an application programming interface (API) from a cloud service provider or from a computer program product executing locally on the computer system 12 itself. Alternatively, or in addition, text can be extracted by identifying a notification window in the captured screen images when difference in the captured images is detected, and using text extraction application programming interface (API) that is provided by an operating system (for example, WM_GETTEXT API in WINDOWS™) or other platforms. The API request includes an identify, for example, location, of the identified notification window for the operating system to provide the extracted text.

The method further includes determining a user-importance score for the notification 40, at 430. The user-importance score represents an importance level of the notification for the user 50. In one or more examples, the same notification 40 that is generated for a first user can have a first user-importance score that is different from a second user-importance score that is generated for a second user. For example, the notification 40 can be an email from a third user that is sent for receipt by the first user and the second user, resulting in different user-importance scores for the first user and the second user respectively.

The user-importance score is determined based on the user-profile for the user 50. Computing the user-importance score includes assigning each factor from the user-profile score points. For example, communication service used, users in communication, featured words in the profile are respectively associated with score points. Consider an example scenario where a communication-service-1 has 5 pts, a communication-service-2 has 10 pts; a user-A has 5 pts, a user-B has 4 pts, a featured-word-1 has 1 pts, and a featured-word-2 has 1 pts, and the like. In this manner, a higher score is assigned to notifications corresponding to factors that are accessed with higher frequency by the user 50.

Further, the method includes computing the user-importance score for the notification 40 based on the information extracted from the notification 40 and using the score points assigned according to the user-profile. For example, the user-importance score is computed by accumulating score points given to the factors that match with the factors provided in the user profile 55. The accumulated score is recognized as the user-importance score of the notification 40.

For example, consider that an extracted information for the notification-X 40 includes notification X: communication-service-1, user-A, and featured-word-1. Here, the user-importance score for notification-X 40 is 5 pts+5 pts+1 pts=11 pts. Further, consider a notification-Y 40 that includes: communication-service-2, user-B, and featured-word-2. Here, the user-importance score for notification-Y is 10 pts+4 pts+1 pts=15 pts.

Referring again to the flowchart of FIG. 4, the method further includes playing back the digest of notifications 40 from the notification repository 307, which is populated during the user's absence, the playback using the user-importance scores, at 440.

Figure 6:
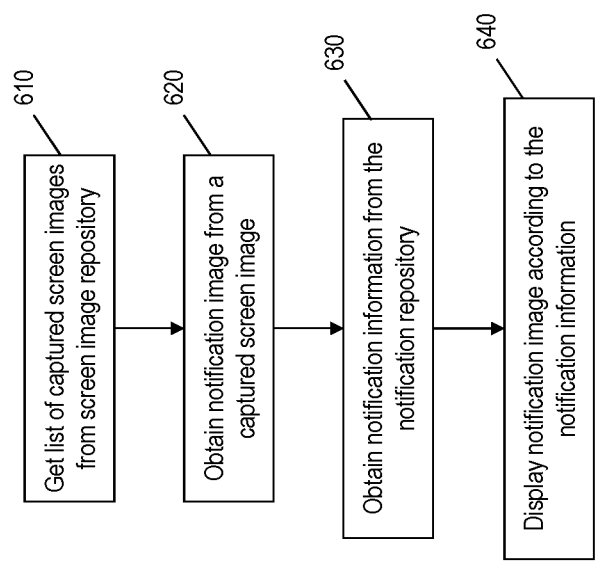
FIG. 6 depicts a flowchart of an example method for playing back the recorded notifications according to one or more embodiments of the present invention.
Figure 7:
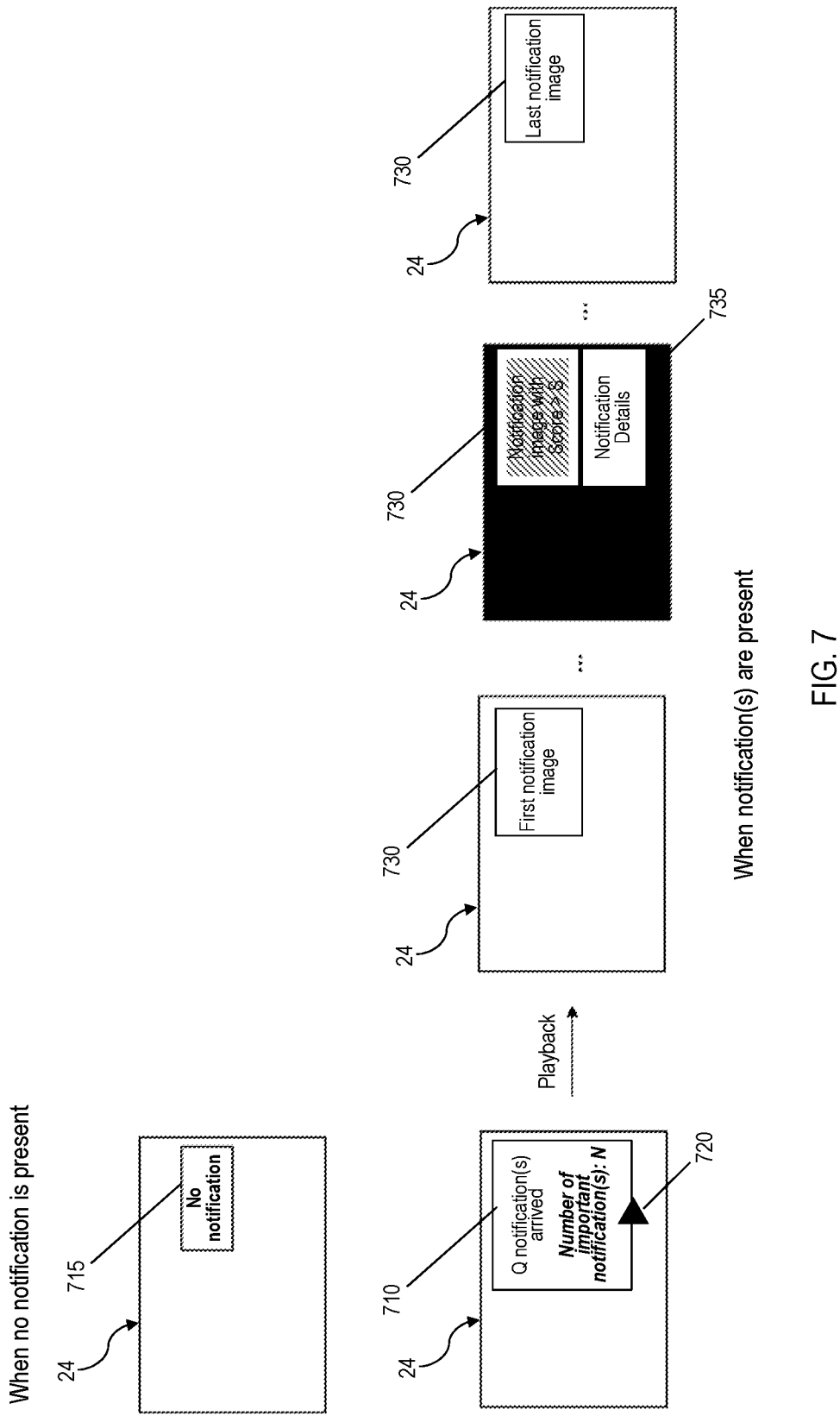
FIG. 7 depicts examples of a digest notification message according to one or more embodiments of the present invention.

FIG. 6 depicts a flowchart of an example method for playing back the recorded notifications according to one or more embodiments of the present invention. FIG. 7 depicts examples of a digest notification message according to one or more embodiments of the present invention.

In one or more examples, when the user 50 returns to his/her desk, the user 50 is notified of presence or absence of the notification(s) 40 during his/her absence via a digest notification message. When the user 50 is notified of the presence of one or more notifications 40 in the notification repository 307, the digest notification message 710 provides a user interface element 720, such as a button for playing back the recorded notifications 40.

The digest notification message 710 that is displayed further indicates a number of notification(s) 40 that were recorded in the notification repository 307 during the user's 50 absence. The digest notification message 710 also can indicate a number of notifications (N) that have a user-importance score above the predetermined threshold. As described herein, in case there are no recorded notifications in the notification repository 307, a no notification message 715 is displayed instead of the digest notification message 710.

Once the user 50 uses the playback button 720, the recorded notifications are displayed to the user 50. Referring to the flowchart from FIG. 6, the playback includes getting a list of the captured screen images from the screen capture repository 305, at 610. The method further includes extracting a region of the notification 40 from each captured screen image, at 620. Extracting the region includes determining the pixels that include the notification 40 in the captured screen image. In one or more examples, more than one regions are extracted where the captured screen image has more than one notifications, each extracted region corresponding to respective notifications. The extracted region(s) are used as a notification image 730 for displaying to the user 50.

The method further includes obtaining the corresponding notification information from the notification repository 307, at 630. For example, for a first captured screen image from the screen capture repository 305, the corresponding first notification information from the notification repository 307 are accessed. The notification information includes the one or more factors of information according to the user profile 55.

The method further includes displaying the notification image to the user 50 based on the notification information, at 640. For example, if the notification information indicates that the user-importance score is greater than the predetermined threshold, that is, the notification is "important" the notification image 730 is highlighted and an additional user interface element 735 is displayed that includes one or more factors from the notification information.

In one or more examples, the playback includes displaying the notification image 730 for a predetermined duration, such as 3 seconds, 5 seconds and the like. In one or more examples, the "important" notification images corresponding to user-importance scores higher than the predetermined thresholds are displayed for a second duration that is longer than other notification images 730, for example 7 seconds, 10 seconds. Accordingly, along with the highlight, the important notifications are displayed for a longer duration based on the user-importance score.

Each of the screen capture image from the screen capture repository 305 is processed in this manner to display the notifications received during the user's 50 absence, at 650. The user 50 accordingly receives a digest of all of the notifications 40 that the user 50 may have missed while the user 50 was away from the computer system 12.

Accordingly, one or more embodiments of the present invention improve the performance of a computer system and particularly a notification system, and more particularly when a user is not present at the computer system. One or more embodiments of the present invention, are accordingly, rooted in computing technology, such as user interfaces for notifications, and notifications for electronic communications, and electronic communications. The one or more embodiments of the present invention provide improvements to such computing technology.

In one or more examples, one or more embodiments of the present invention facilitate displaying past information to a user. An example method can include collecting a history of operations of the user performed on information displayed on a computer system and recording such interaction as part of a user profile. Further, in response to detecting that a notification is displayed on the computer system, an importance level of the notification is determined based on the user profile. Further, the method includes determining whether the user is watching the computer system. The method further includes, based on a determination that the user is not watching the computer system, capturing screen images (screenshots) at a predetermined frequency. When a change in the screen exceeds a predetermined value, an importance level is obtained from information of the screen by consulting the user profile. Further, the method includes recording the captured screen image and the corresponding user-importance score of the notification. Further yet, the method includes, based on a determination that the user is watching the computer system, displaying the recorded screen information in accordance with the importance scores.

In one or more examples, the user-importance score of the notification that is stored as part of the notification information is determined based on the user profile. For example, the user-importance score is computed based on one or more factors from the user profile. The user profile can include name of communication application used more than a certain number of times per a predetermined period of time, a name of another user that the user has communicated with a certain number of times, one or more featured words extracted from a text consulted by the user for a certain period of time or longer, and an access time period obtained by eye gaze information.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
based on a determination that a user is not present at a computing device, capturing a plurality of screen images from the computing device;
detecting a plurality of notifications being received based on a plurality of notification popups that are identified from pairs of consecutively captured screen images from the plurality of screen images, each pair comprising a first screen image and a second screen image;
extracting a notification information for each of the plurality of notifications by extracting the plurality of notification popups from portions of the captured screen images corresponding to the plurality of notifications respectively; and
based on a determination that the user has returned at the computing device, generating and displaying a single digest notification that comprises the extracted notification information from each of the plurality of notification popups that were received when the user was not present,
wherein displaying the single digest notification comprises a playback of the plurality of notifications that are received when the user was not present, the plurality of notifications that are associated with a user-importance score above a predetermined threshold are highlighted during the playback.

2. The computer-implemented method of claim 1, wherein the portions of the captured screen images that are extracted render the plurality of notification popups.

3. The computer-implemented method of claim 1, wherein extracting the notification information comprises optical character recognition.

4. The computer-implemented method of claim 1, wherein extracting the notification information comprises determining one or more parameters according to a user profile of the user.

5. The computer-implemented method of claim 1, further comprising computing the user-importance score for the plurality of notifications that are received when the user was not present.

6. The computer-implemented method of claim 5, wherein displaying the single digest notification comprises playing back the plurality of notifications that are received when the user was not present, wherein, during the playback, a first notification that is associated with a user-importance score above a predetermined threshold is displayed for a longer duration than a second notification that has a lower user-importance score.

7. The computer-implemented method of claim 5, wherein displaying the single digest notification comprises a playback of the plurality of notifications that are received when the user was not present in order of the user-importance score.

8. The computer-implemented method of claim 5, wherein displaying the single digest notification comprises a playback of only the plurality of notifications that have user-importance scores above a predetermined threshold.

9. A system comprising:
a memory; and
a processor coupled with the memory, the processor configured to generate a single digest notification for a plurality of notifications received when a user is not present,
wherein generating the single digest notification comprises performing a method that comprises:
based on a determination that the user is not present at a computing device, capturing a plurality of screen images from the computing device;
detecting the plurality of notifications being received based on a plurality of notification popups that are identified from pairs of consecutively captured screen images from the plurality of screen images, each pair comprising a first screen image and a second screen image; and
extracting a notification information for each of the plurality of notifications by extracting the plurality of notification popups from portions of the captured screen images corresponding to the plurality of notifications respectively;
based on a determination that the user has returned at the computing device, generating and displaying the single digest notification that comprises the extracted notification information from each of the plurality of notification popups that were received when the user was not present,
wherein displaying the single digest notification comprises a playback of the plurality of notifications that are received when the user was not present, the plurality of notifications that are associated with a user-importance score above a predetermined threshold are highlighted during the playback.

10. The system of claim 9, wherein the portions of the captured screen images that are extracted render the plurality of notification popups.

11. The system of claim 9, wherein extracting the notification information comprises optical character recognition.

12. The system of claim 9, wherein extracting the notification information comprises determining one or more parameters according to a user profile of the user.

13. The system of claim 9, further comprising computing the user-importance score for the plurality of notifications that are received when the user was not present.

14. The system of claim 13, wherein displaying the single digest notification comprises playing back the plurality of notifications that are received when the user was not present, wherein, during the playback, a first notification that is associated with a user-importance score above a predetermined threshold is displayed for a longer duration than a second notification that has a lower user-importance score.

15. A computer program product comprising a computer readable storage medium having stored thereon program instructions executable by one or more processing devices to perform a method comprising:
based on a determination that a user is not present at a computing device, capturing a plurality of screen images from the computing device;
detecting a plurality of notifications being received based on a plurality of notification popups that are identified from pairs of consecutively captured screen images from the plurality of screen images, each pair comprising a first screen image and a second screen image; and
extracting a notification information for each of the plurality of notifications by extracting the plurality of notification popups from portions of the captured screen images corresponding to the plurality of notifications respectively;
based on a determination that the user has returned at the computing device, generating and displaying a single digest notification that comprises the extracted notification information from each of the plurality of notification popups that were received when the user was not present, wherein displaying the single digest notification comprises a playback of the plurality of notifications that are received when the user was not present, the plurality of notifications that are associated with a user-importance score above a predetermined threshold are highlighted during the playback.

16. The computer program product of claim 15, wherein the portions of the captured screen images that are extracted render the plurality of notification popups.

17. The computer program product of claim 15, wherein extracting the notification information comprises determining one or more parameters according to a user profile of the user.

18. The computer program product of claim 15, further comprising computing the user-importance score for the plurality of notifications that are received when the user was not present.

\* \* \* \* \*